Figures 1, 2, 4:
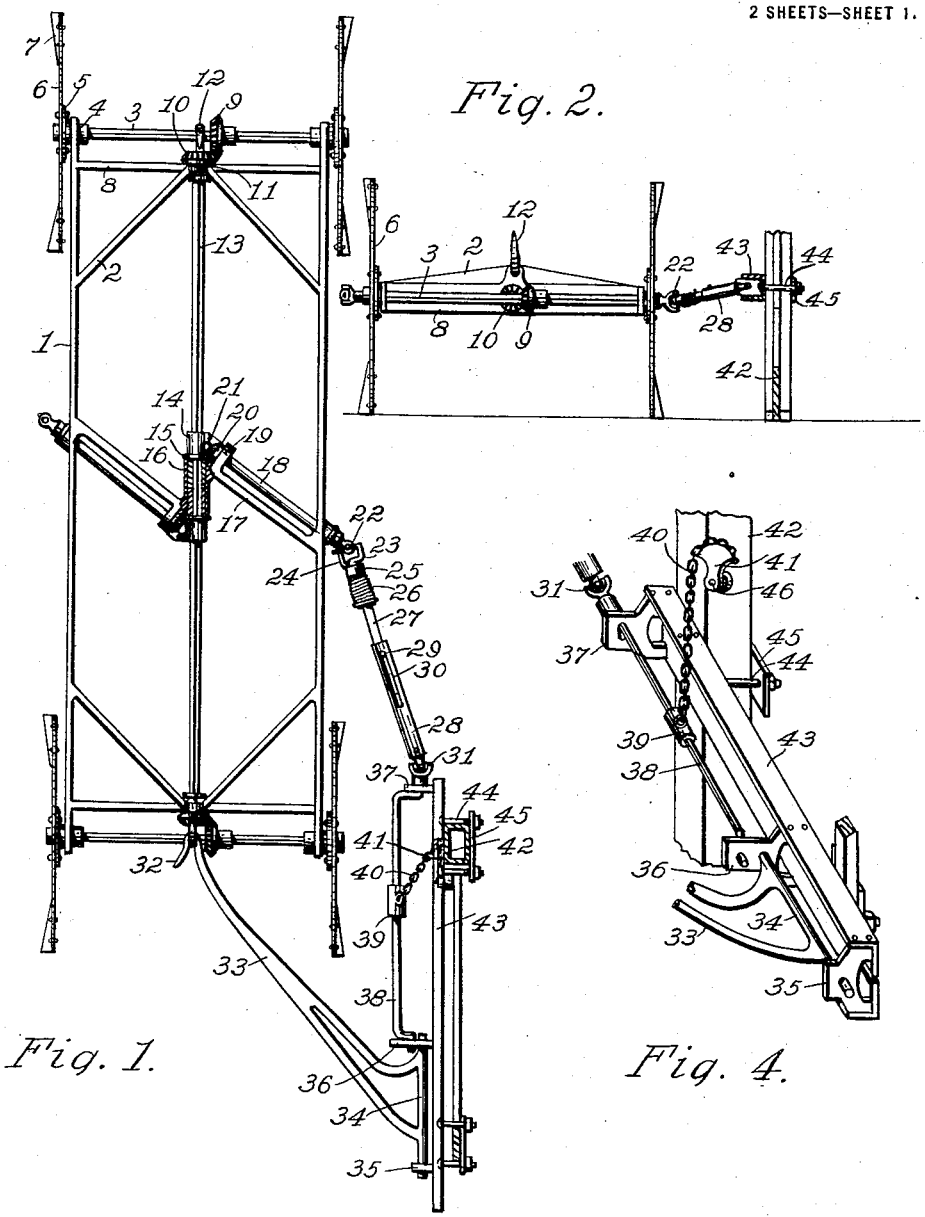

A. L. WALTERS.
CHECK ROW ATTACHMENT FOR PLANTERS.
APPLICATION FILED JUNE 7, 1916.

1,218,820.

Patented Mar. 13, 1917.
2 SHEETS—SHEET 1.

Inventor,
Arthur L. Walters, by
G. C. Kennedy.
Attorney.

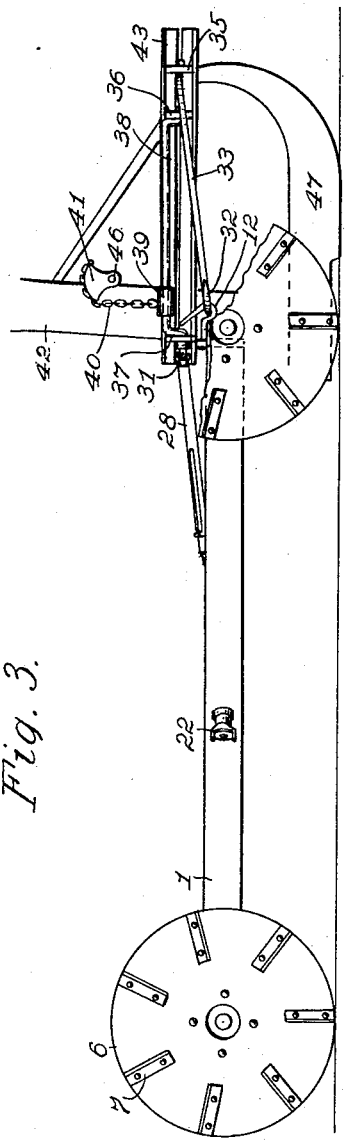

UNITED STATES PATENT OFFICE.

ARTHUR L. WALTERS, OF WADENA, IOWA.

CHECK-ROW ATTACHMENT FOR PLANTERS.

1,218,820.  Specification of Letters Patent.  Patented Mar. 13, 1917.

Application filed June 7, 1916. Serial No. 102,281.

*To all whom it may concern:*

Be it known that I, ARTHUR L. WALTERS, a citizen of the United States of America, and a resident of Wadena, Fayette county, Iowa, have invented certain new and useful Improvements in Check-Row Attachments for Planters, of which the following is a specification.

My invention relates to check-row attachments for planters, and the object of my improvement is to supply for use with planters, a detachable attachment capable of employment in coöperation therewith in accurately check-rowing a field.

This object I have accomplished by the means which are hereinafter described and claimed, and which are illustrated in the accompanying drawings, in which:

Figure 1 is a plan view of my check-row attachment as connected operatively to one of the seeding-devices and shoes of a planter; Fig. 2 is a front elevation thereof; Fig. 3 is a side elevation thereof, with parts broken away; Fig. 4 is an enlarged perspective detail view of the means mounted on the seed-shoe for operating the seed-dropping mechanism; Fig. 5 is a longitudinal section of the adjustable detachable universal coupling-means between the check-row attachment and the said means for operating the seed-dropping mechanism, and Fig. 6 is an enlarged perspective detail of one of the bushings used on a hexagonal shaft.

Similar numerals of reference denote corresponding parts throughout the several views.

My improved check-row attachment comprises a rectangular frame 1, the prolongations of whose side-bars 1 have bearing-openings to rotatably seat the cylindrical sleeves 4 fitted on the hexagonal cross-shafts 3, the fillets 48 on the sleeves holding the sleeves in place. On the outer ends of said sleeves are secured disks 5, on which are mounted the circular wheels or disks 6, provided with radial flanges 7 for insuring proper engagement with the soil as the wheels rotate, to prevent slipping or lost forward motion.

The numeral 13 denotes a hexagonal rotatable shaft positioned medially and longitudinally in the frame 1, and whose opposite ends have like sleeves 4 mounted rotatably in bearing-openings in the cross-bars 8 of said frame. On the ends of said shaft are fixed the small bevel-gears 10, engaged by bevel-pinions 9 fixed on the cross-shafts 3. On the middle of the shaft 13 is a bearing-sleeve 16 fixed on obliquely arranged transverse frame-bars 17 having orificed bearing-lugs 19 for like oblique hexagonal rotatable shafts 18 carrying like bevel-pinions 20 on their inner ends. Sleeves 15 (like the sleeves 4) are mounted on the hexagonal shaft 13 to rotate in the bearing-sleeves 16. Hubs 14, fixedly mounted on the shaft 13 next to the sleeves 15, have segmental gears 21 thereon adapted, when rotated with the shaft 13, to come into mesh with the bevel-pinions 20, to rotate the latter once at intervals during each rotation of the shaft 13.

On the outer end of each hexagonal shaft 18 is mounted a cylindrical sleeve like said sleeve 4, which rotates with the shaft in a bearing-opening in the side-bar 1, and on the outwardly extending end of said shaft is fixed a member 22 of a universal-coupling.

Referring to Fig. 5, it will be seen that the parts of this coupling are detachable from each other. The other coupling-part 23 is fixed on an end of a squared shaft 27, and its bent over pintle is orificed to receive a pin 24 extending fixedly from a slidable collar 25 on said shaft 27, held in place yieldingly by means of a coiled spring 26 positioned between said collar and a washer 51 held by a pin 52 fixed in the shaft. The collar 25 has an eye 49 receiving one end of a cord 50, by pulling which the collar may be slid up on the shaft 27 to separate its pin 24 from the coupling-part 23, whereby the coupling connection with the first-mentioned coupling-part 22 may be severed.

On the squared shaft 27 a sleeve 28 is slidably non-rotatably mounted, the sleeve having a longitudinal slot 30 to receive a fixed pin in the shaft 27. The squared shank 54 of a coupling-part 31 is mounted in the other end of the sleeve 28, and retained in place by means of a set-screw 53.

The universal-coupling 31 is fixed on the end of a crank-shaft 38, whose ends are rotatably mounted in bearing-openings in bearing-bodies 37 and 36 fixedly mounted between opposed flanges of spaced parallel angle-bars 43. These angle-bars are clamped across the abutting side of a seeding-shoe 47 of a planter by means of bolts 44 passed between the angle-bars and secured in cross-plates 45 on the opposite parts of the shoe. A short sleeve 39 is slidably rotatably mounted on the crank-portion of the crank-shaft 38 and has an eye to which is connected one end of a short chain 40 leading to and about a grooved bearing edge on a sector 41 fixed on the rock-shaft 46 which actuates the seed-dropping mechanism (not shown) of the planter-shoe.

The angle-bars 43 are long enough to permit of being mounted adjustably on any of the shoes of usual makes of planters. A third bearing-body 35 is secured between the angle-bars at their forward ends, and a shaft 34 is mounted in bearings-openings in this body and in the adjacent bearing-body 36, and is provided with an obliquely and rearwardly directed arm 33 having at its extremity a hook 32.

In a raised part 11 of each frame cross-bar 8, is a bearing-opening, in which is seated a rock-hook 12. The hook 32 may be coupled with either of the said hooks 12.

When the wheeled frame 1 is operatively connected to the angle-bars 43 and to the crank-shaft 38 by the means heretofore described, the device is ready for operation when the planter is driven forwardly. At each rotation of the carrying-wheels 6, the segment-gears 21 are rotated once, and by the single rotation thus imparted to the bevel-pinion 20 in use, imparts by means of said universal-coupling connections a single rotation of the crank-shaft 38, to cause the chain 40 to rock over once the sector 41, thus actuating the seed-dropping mechanism of the planter to drop seed once, and the usual reaction spring (not shown) acting on the shaft 46, returns the sector to its first position. In Fig. 4 is shown the upright position of the crank on the crank-shaft 38 at the beginning of the operation of rocking the sector 41, so it is clear that the actuation of the seed-dropping mechanism will be quick and effective. The carrying-wheels 6 are made of a determined diameter, such as will correctly measure the intervals between the locations for dropping the seed, and it is obvious that by the means shown check-rowing will be accurately done, without regard to the contour of the surface traversed, or the line of direction of the planter. At the end of each row, the universal-joint 22—23 may be uncoupled, and the frame 1 lifted bodily and transferred to its new position adjacent the end of another row, so that the check-rowing may begin again exactly at the end of the row, without possibility of any displacement or variation in correct check-rowing.

Various changes may be made in minor details of my device, such as number, location, or arrangements of the parts or connections, without departing from the principle of this invention, or the scope of its protection.

Having described my invention, what I claim as new, and desire to secure by Letters Patent, is:

1. In a device of the character described, an independent frame located at one side of a planter containing at each end traveling wheels of a like predetermined circumference, a longitudinal rotary driving shaft in said frame, operative connections between said wheels and said shaft, like driven shafts extending oppositely obliquely from said driving-shaft, operative connections between said driving- and driven-shafts adapted to rotate the driven shafts at intervals corresponding in number to the rotations of said traveling-wheels a crank mounted rotatably on the planter, universal-couplings connected detachably and interchangeably to and between either of said driven-shafts and said crank, operative connections between said crank and the seed dropping mechanism of the planter adapted to actuate said seed-dropping mechanism at each rotation of the crank, and a separable draft-connection between said frame and the adjacent seed-covering shoe of the planter.

2. In a device of the character described, an attachment for a planter, comprising a frame mounted on like traveling wheels at either end of the predetermined circumference, a driving-shaft rotatably mounted longitudinally in said frame, driving-connections between said wheels and the ends of said driving-shaft, driven-shafts mounted rotatably in said frame transversely, obliquely and oppositely, driving-connections between said driving-shaft and the adjacent ends of said driven-shafts adapted to rotate the latter at intervals with a number of rotations corresponding to those of said traveling-wheels, bracketed supporting-means on a shoe of said planter, a detachable draft-connection between said supporting-means and an end of said frame adapted for interchangeable coupling to either end of the frame, a crank-shaft rotatable in bearings in said supporting-means, a universal-joint connection between one of said driven-shafts and the crank-shaft adapted to be interchangeably connected to either driven shaft, and operative mechanism between the crank on said crank-shaft and the seed-dropping mechanism of the planter adapted to actuate said seed-dropping mechanism once for each rotation of said traveling-wheels.

3. In a device of the character described, an attachment for a planter containing traveling-wheels of a predetermined circumference at either end, hexagonal cross-shafts on which said wheels are fixed, cylindrical sleeves non-rotatably mounted on said cross-shafts and rotatably mounted in bearings in said frame, a medial longitudinal hexagonal driving-shaft in said frame, cylindrical sleeves non-rotatably mounted on the ends of said driving-shaft and rotatably mounted in the bearings in the ends of said frame, like intermeshing gearing on the cross-shafts and the ends of said driving-shaft, a bearing fixedly mounted in the center of said frame, sleeves fixed on said driving-shaft and rotatable in said bearing, obliquely-directed like driven-shafts rotatably mounted in said frame, like segmental gears mounted on said driving-shaft, pinions on said driven-shafts in mesh at intervals with said segmental gears, a crank-shaft mounted rotatably on a shoe of the planter, operative connections between the crank on said shaft and the seeding-mechanism of the planter, a universal-joint coupling-connection adapted to be detachably connected between either of said driven-shafts and said crank-shaft, a separable universal-joint between said squared shaft and either of said driven-shafts, a sleeve slidably non-rotatably mounted on said squared shaft, means for limiting the movement of said sleeve on said shaft, a universal-joint connection between said sleeve and said crank-shaft, and a movable draft-connection between said shoe and said frame, adapted to be detachably connected to either end of said frame.

Signed at Waterloo, Iowa, this 3d day of June, 1916.

ARTHUR L. WALTERS.

Witnesses:
 PEARL STANTON,
 GEO. C. KENNEDY.

Copies of this patent may be obtained for five cents each, by addressing the "Commissioner of Patents, Washington, D. C."